US007142188B2

(12) United States Patent
Tsumura et al.

(10) Patent No.: US 7,142,188 B2
(45) Date of Patent: Nov. 28, 2006

(54) IMAGE DISPLAY DEVICE

(75) Inventors: Makoto Tsumura, Hitachi (JP); Tsunenori Yamamoto, Hitachi (JP); Tatsuki Inuduka, Mito (JP)

(73) Assignee: Hitachi, Ltd., Tokyo (JP)

(*) Notice: Subject to any disclaimer, the term of this patent is extended or adjusted under 35 U.S.C. 154(b) by 214 days.

(21) Appl. No.: 10/101,164

(22) Filed: Mar. 20, 2002

(65) Prior Publication Data

US 2003/0063062 A1 Apr. 3, 2003

(30) Foreign Application Priority Data

Sep. 28, 2001 (JP) ............................ 2001-298988

(51) Int. Cl.
*G09G 3/36* (2006.01)
*G02F 1/1335* (2006.01)

(52) U.S. Cl. ........................................ 345/102; 349/68

(58) Field of Classification Search .......... 345/87–102; 349/68–71, 106; *G09G 3/36*

See application file for complete search history.

(56) References Cited

U.S. PATENT DOCUMENTS

| | | | | |
|---|---|---|---|---|
| 5,122,791 | A * | 6/1992 | Gibbons et al. | 345/102 |
| 5,225,823 | A * | 7/1993 | Kanaly | 345/89 |
| 5,563,621 | A * | 10/1996 | Silsby | 345/43 |
| 6,050,704 | A * | 4/2000 | Park | 362/260 |
| RE36,792 | E * | 7/2000 | Sonehara | 348/791 |
| 6,181,311 | B1 * | 1/2001 | Hashimoto | 345/98 |
| 6,611,249 | B1 * | 8/2003 | Evanicky et al. | 345/102 |
| 6,724,354 | B1 * | 4/2004 | Spitzer et al. | 345/32 |
| 2001/0035853 | A1 * | 11/2001 | Hoelen et al. | 345/102 |

* cited by examiner

*Primary Examiner*—Alexander Eisen
(74) *Attorney, Agent, or Firm*—Antonelli, Terry, Stout and Kraus, LLP.

(57) ABSTRACT

A multi-color display system operates to suppress deterioration in resolution and increase in power consumption or deterioration in brightness. The multi-color display system includes n types of spectrum selecting means; m types of light sources each having a different spectral distribution; light source controlling means for controlling, on a time-division basis, emissions from the m types of light sources; color light sources controlled by the light source controlling means and the n types of spectrum selecting means, the number of the color light sources being not less than n+1, but not more than n×m; and a light valve for controlling transmittance or reflectance of light in accordance with image information.

19 Claims, 12 Drawing Sheets

IMAGE DISPLAY DEVICE

BACKGROUND OF THE INVENTION

The present invention relates to a multi-color image display device that is capable of reconciling wide range color reproduction and high-definition display.

A liquid crystal display device, which represents an example of conventional image display devices, is provided with a white light source or a tricolor light source, having a maximum value of three colors of red, green and blue, and a subpixel that is disposed for each of the pixels for selectively transmitting a color by way of color filters of red, green and blue. The liquid crystal display device displays an image by applying an electric field to a liquid crystal enclosed between electrodes that form each of the subpixels, which electrodes are supplied with a voltage in accordance with image information, so as to control the transmittance or reflectance of colors.

The range of expression realized by the above-described system is limited to a range inside a triangle formed by the tricolor light source on a chromaticity diagram. Therefore, it is impossible for the system to reproduce all colors existing in nature, and the system sometimes cannot meet the demands of displaying a color tone, texture, brilliance, etc. that should appeal to the human senses. For example, objectives that are expected to be accomplished in terms of an insufficient range of expression include a higher level of high-fidelity image reproduction, such as diagnostic precision in the field of telemedicine that employs a communication network, and the expression of values of curios and merchandise in electronic museums and electronic transactions. Hence, various multi-color display devices have been proposed in order to meet such demands.

For example, in a natural vision system proposed by Japanese Patent Laid-open No. 7-330564 and a Technical Report No. EID2000-228 (2000-11) issued from Institute of Electronics, Information and Communication Engineers, a color is no longer picked up and displayed by way of the three primary colors, but is treated as spectrum information to be picked up, converted, transmitted and displayed as multi-color data. In this system, a multi-color camera of 16 bands is used as a picking up system to measure information regarding illumination for an object and to transmit the measured information together with other data, thereby realizing a transmission and reproduction of high-fidelity image data between remote locations.

Also, in order to meet the above demands, there has been developed a six primary color display device wherein projection images respectively captured by two liquid crystal projectors are synthesized. In the six primary color display device, narrow bandwidth color filters of three primary colors having different transmission wavelength bandwidths, respectively, are disposed in light paths of red, green and blue in each of the optical systems of the projectors, to thereby improve the color purity, and a six primary colors display is realized by combining two types of projectors having different color reproduction ranges.

There have been proposed other display systems, such as a time-division system wherein multi-color color filters are provided on a rotating disk to display colors on the basis of time-division, a spatial pixel arrangement system, a plane division system and a system combining these systems.

Characteristics of a multi-color display device will be explained in detail with reference to FIG. 11. FIG. 11 is a chromaticity diagram showing color reproduction ranges that are indicated by numerical values. A visible area 501 represents a range of colors capable of human perception, and a display device is required to display a range as wide as possible in the visible area 501 to achieve excellent color reproducibility. Characteristic 502 represents an example of the display range of the conventional three primary color display device, which is an area of a triangle formed by the three primary colors. In turn, a display area 503 of the multi-color display device is expanded by way of the multi-color display of four or more primary colors. The present example represents a display produced by way of six primary colors; and, therefore, the display area is considerably expanded as compared with the conventional three primary color display. In the case of three primary colors, the mixing ratio of red (R), green (G) and blue (B) for each of colors is uniquely defined; however, in the case of a six primary color display, the degree of freedom of display is increased and the mixing ratio is not defined uniquely. A color conversion method in the multi-color display is disclosed in Japanese Patent Laid-open No. 6-261332, for example. Thus, it is apparent from FIG. 11 that the multi-color display enables the production of a display that is high in the color purity of each of the primary colors, which was not achieved by the conventional three primary color display, as well as the reproduction of colors that are profoundly impressive for human sensitivity, such as deep red, deep blue and fresh green.

As mentioned above, it has been disclosed that the multi-color display device can reproduce a texture having the same quality as that captured by a sender without being influenced by the ambient light, by performing correction processing based on the spectral information of ambient light of both of the image pick-up location and image displaying location.

A multi-color display device that can display even a texture of an object is suitable for a large screen display employing a screen of the type which is used in electronic museums and theatres, and there are expected applications thereof related to a personal computer and a mobile information terminal that are improved in portability by the downsizing and lightening of these devices. Especially, for the field of portable display devices, a display device that can correct the influences of illumination and which has a wide display range is in demand, since the ambient illumination for the portable display device changes with movement. In order to clarify the problems in realizing a multi-color display device as a direct-view type liquid crystal display device feasible for downsizing and lightening, a description will be made of a color reproduction system employed in a conventional liquid crystal display device.

Examples of the color reproduction system for the conventional direct-view type liquid crystal display device include a subpixel system using a color filter and a color field sequential system using a tricolor flashing light source, not a color filter.

In a color filter system, a white light source for continuous lighting is used. An area for one pixel is divided into three subpixels, and the three subpixels are respectively provided with color filters of red, green and blue, as well as pixel electrodes. In the case of an active matrix, the system is further provided with an amorphous, a polycrystalline or a monocrystalline film transistor that is placed between a signal wiring and a pixel electrode, and which functions as a switching element for writing a voltage signal. When the brightness from the light source is constant, the brightness of the display device is determined by the transmittance of the color filters and the aperture ratio of a pixel, that is, a ratio of the area of the aperture. In the case of realizing a multi-color display device by way of the subpixel system using color filters, the aperture ratio may decrease due to an increase in the number of subpixels, if an area for one pixel is constant, while the resolution may decrease, if the area for one subpixel is constant. When color filters each having a narrow transmission bandwidth and a high color purity are used to increase the number of primary colors, the brightness may decrease due to a deterioration in the transmittance. In such cases, a strong light source will be required to improve the brightness, which leads to an increase in the power consumption and unnecessary heating.

In turn, in the conventional color field sequential system, which does not employ color filters nor a subpixel structure, three primary color light sources of red, green and blue, that can be switched on and off at a high speed, are lit in time sequence, and the transmittance of the pixels is controlled by applying signal voltages to liquid crystals of the pixels in synchronization with the lighting.

The color field sequential system is characterized by its capability for both high brightness and high-definition display owing to the elimination of the color filters and subpixels, although the system requires a liquid crystal display mode having high speed response properties and three primary color light sources. To realize a multi-color display device by way of the color field sequential system, it is necessary to provide a high speed liquid crystal display mode in accordance with an increase in the number of primary colors. For the conventional three primary color display, a response in 2 to 3 milliseconds is required, since it is necessary to respond within a period that is obtained by subtracting the time for writing voltages to pixels and the time for switching on a fluorescent lamp that is used for ordinary illumination.

In the case of applying the system to a multi-color display device of six primary colors, for example, the total time of a period required for writing voltages for one color, a period for the liquid crystal to respond and a period for illumination is about 2.8 milliseconds, with a display frequency being set at 60 Hz, that does not cause a flicker. In this case, the period for writing voltages to pixels and the switching period for illumination consume most of the response time, if the conventional driving system is employed; and, therefore, a response including half tones in not more than 1 millisecond will be required. Thus, it is difficult to apply the conventional color field sequential system to a multi-color display device.

Taking into consideration portable display devices, other than the liquid crystal display device, candidate systems may be a CRT (Cathode Ray Tube) of the type that is widely used for monitors, an EL (Electroluminescent Display) display device using organic or inorganic luminescent materials, a PDP (Plasma Display Panel) and so forth. Since these display systems are of the emission type, they reproduce colors by constructing subpixels in accordance with the number of primary colors to be used, and some printing techniques are applied to the construction of subpixels. Therefore, it is difficult to realize a multi-color display device using three primary colors, or more than three primary colors, with high definition sufficient to represent a texture in terms of the human sense.

SUMMARY OF THE INVENTION

In view of the above considerations, an object of the present invention is to realize a multi-color display system that makes it possible to suppress a deterioration in resolution, an increase in power consumption and a deterioration in brightness.

In order to solve the above problems, according to the present invention, there is provided an image display device comprising: n types of spectrum selecting means, n being 2 or more; m types of light sources, each having a different spectral distribution; light source controlling means for controlling emissions from the m types of light sources on a time division basis; color light sources generated by the light source controlling means and the n types of spectrum selecting means, the number of the color light sources being not less than n+1, but not more than n×m; and a light valve for controlling transmittance or reflectance in accordance with image information.

A preferred example of the transmission spectrum selecting means may be color filters disposed for each of plural pixels. A wavelength band to be selected depending on each of the color filters includes a maximum value of brightness of the light sources, and a band of each of the light sources is narrower than the wavelength bandwidth of each of the color filters, whereby color reproducibility is enhanced.

An active matrix type liquid crystal display device may preferably be used as the light valve, and, especially, one adopting the inplane switching mode having wide viewing angle characteristics is excellent for the light valve.

As for light sources and image rewriting, the light source may be lit for a predetermined period after rewriting an image at a high speed, or the light source may be scrolled in synchronization with rewrite of an image.

According to the present invention, a direct-view type liquid crystal display device to which the invention is applied can realize a multi-color display system without an increase in power consumption owing to reduction in the numerical aperture and without a deterioration in resolution, since the invention can increase the number of primary colors by combining light sources having at least two types of spectra and color filters without increasing the number of subpixels that has been increased in the conventional color filter system.

BRIEF DESCRIPTION OF THE DRAWINGS

The above and other objects, features and advantages of the present invention will become more apparent from the following description, when taken in conjunction with the accompanying drawings, in which.

DETAILED DESCRIPTION OF THE PREFERRED EMBODIMENTS

First Embodiment

A first embodiment of the present invention will be described with reference to FIGS. 1A through 1C and FIG. 7. The present embodiment represents an example of the application of the present invention to a normally black inplane switching mode device, wherein a display mode is employed that is better with respect to the differences in characteristics caused by a change of the viewing angle, i.e., so-called viewing angle characteristics; however, when an image is usually seen from the front, it is possible to employ other display modes having a certain level of high speed response properties, such as the TN (Twisted Nematic) display mode, the ferroelectric liquid crystal display mode and the like.

Figure 1A:
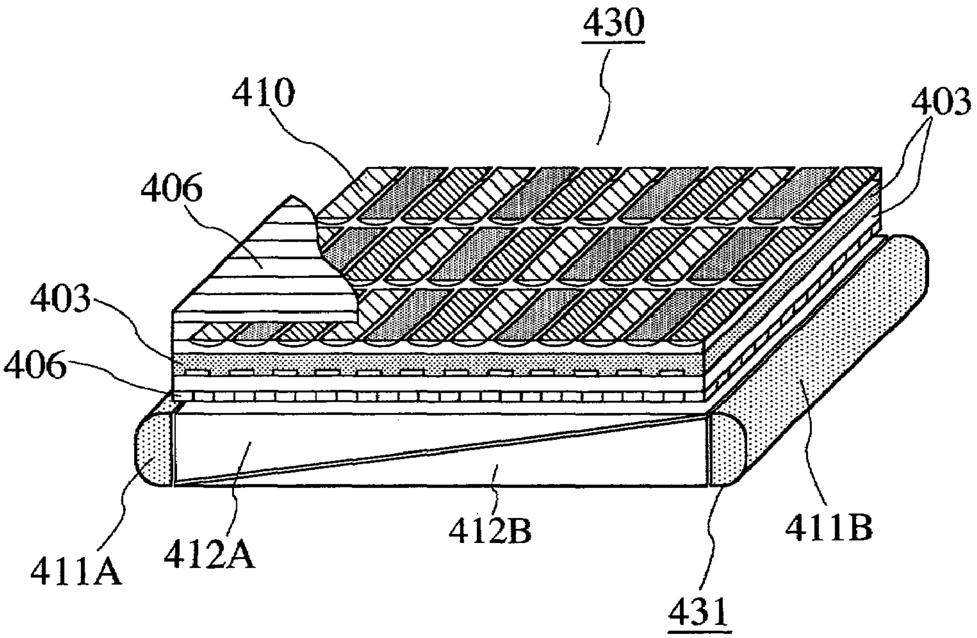
FIG. 1A is a partially cut-away perspective view showing the configuration of a liquid crystal display device according to a first embodiment of the present invention.
Figure 1B:
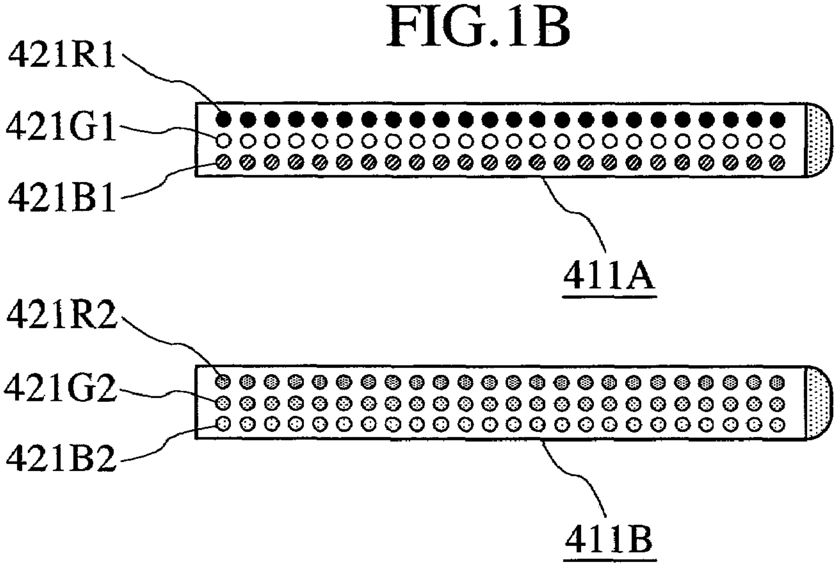
FIGS. 1B and 1C are plan views each showing the configuration of a respective light source unit.
Figure 1C:
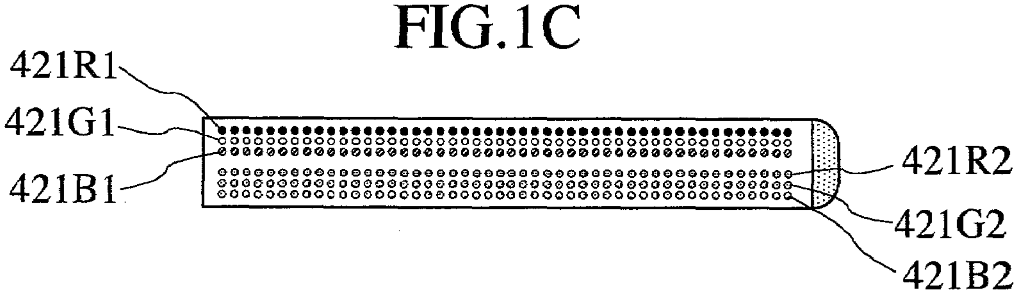
Figure 2:
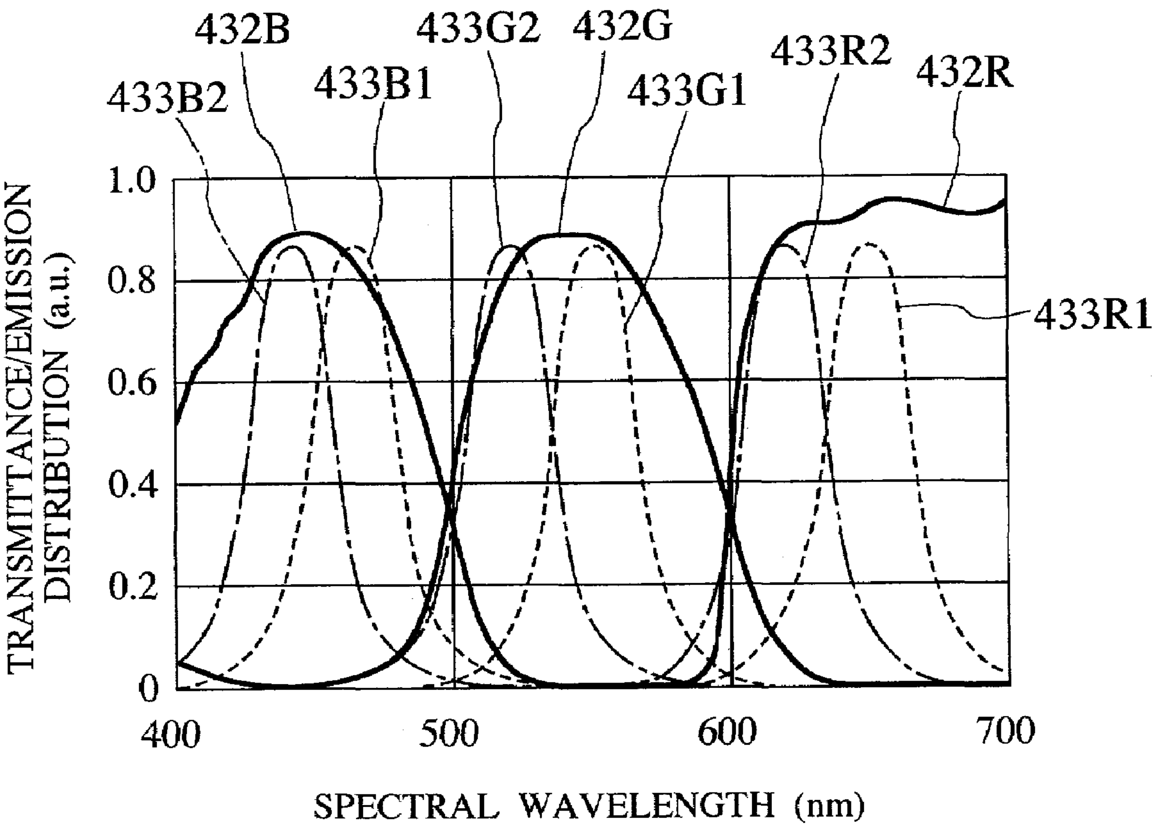
FIG. 2 is a graph showing spectral wavelengths of light sources and color filters according to the first embodiment of the present invention.
Figure 3A:
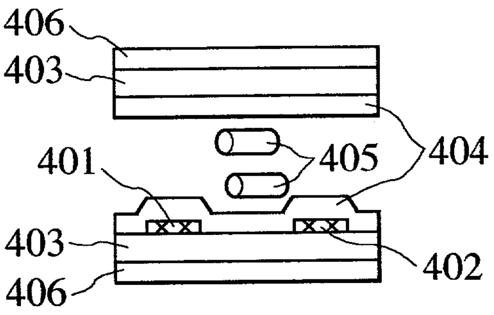
FIGS. 3A to 3D are diagrams which show examples of liquid crystal movements of an inplane switching system liquid crystal display device.
Figure 3B:
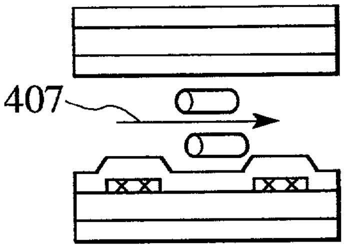
Figure 3C:
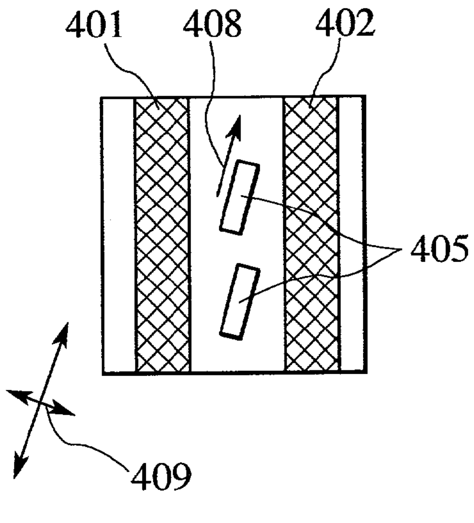
Figure 3D:
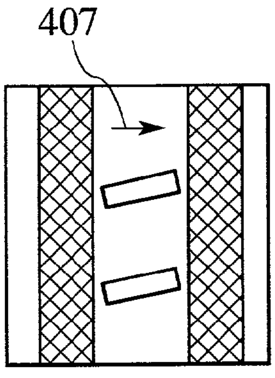
Figure 4:
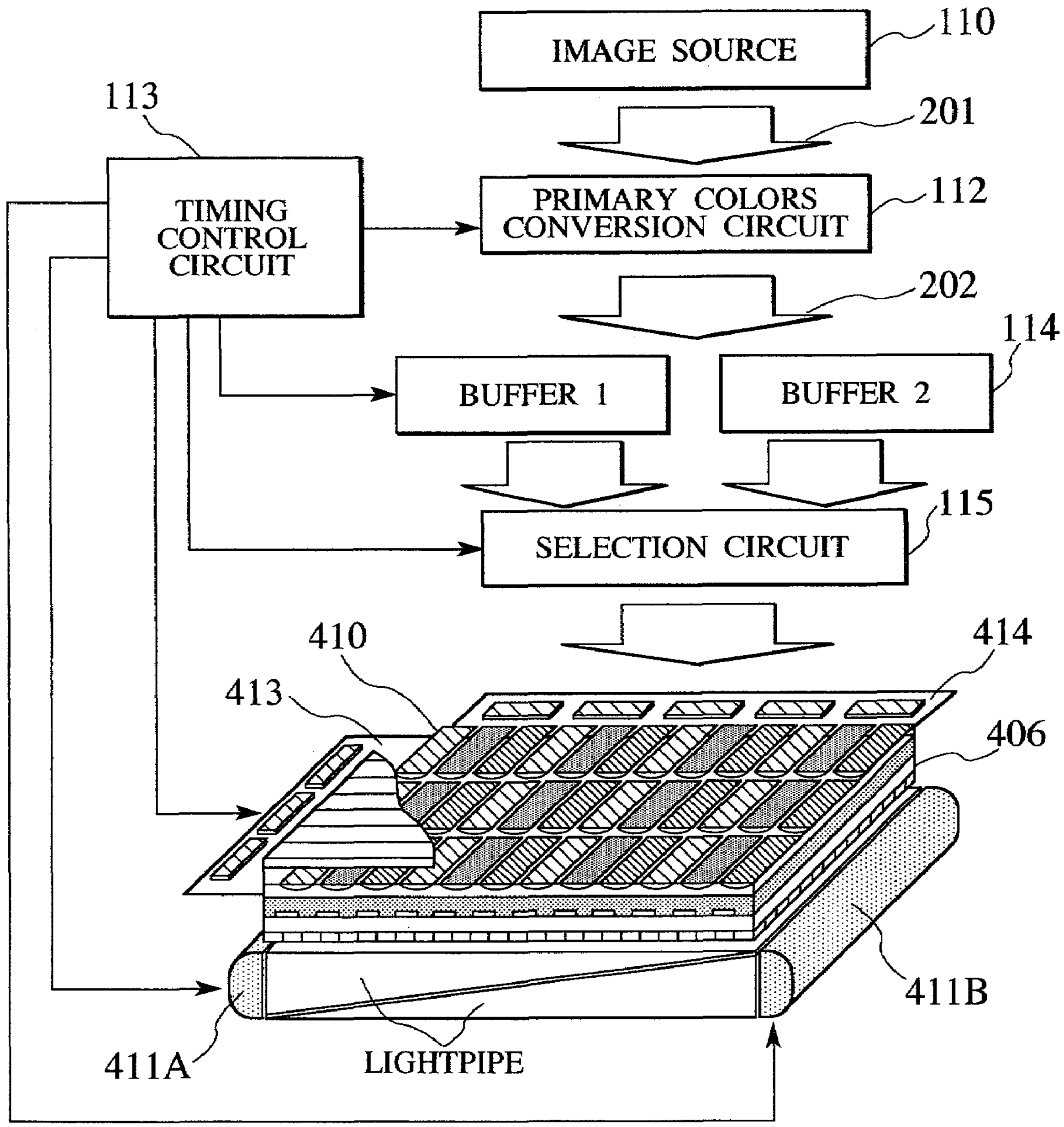
FIG. 4 is a block diagram showing a system of the first embodiment.
Figure 5:
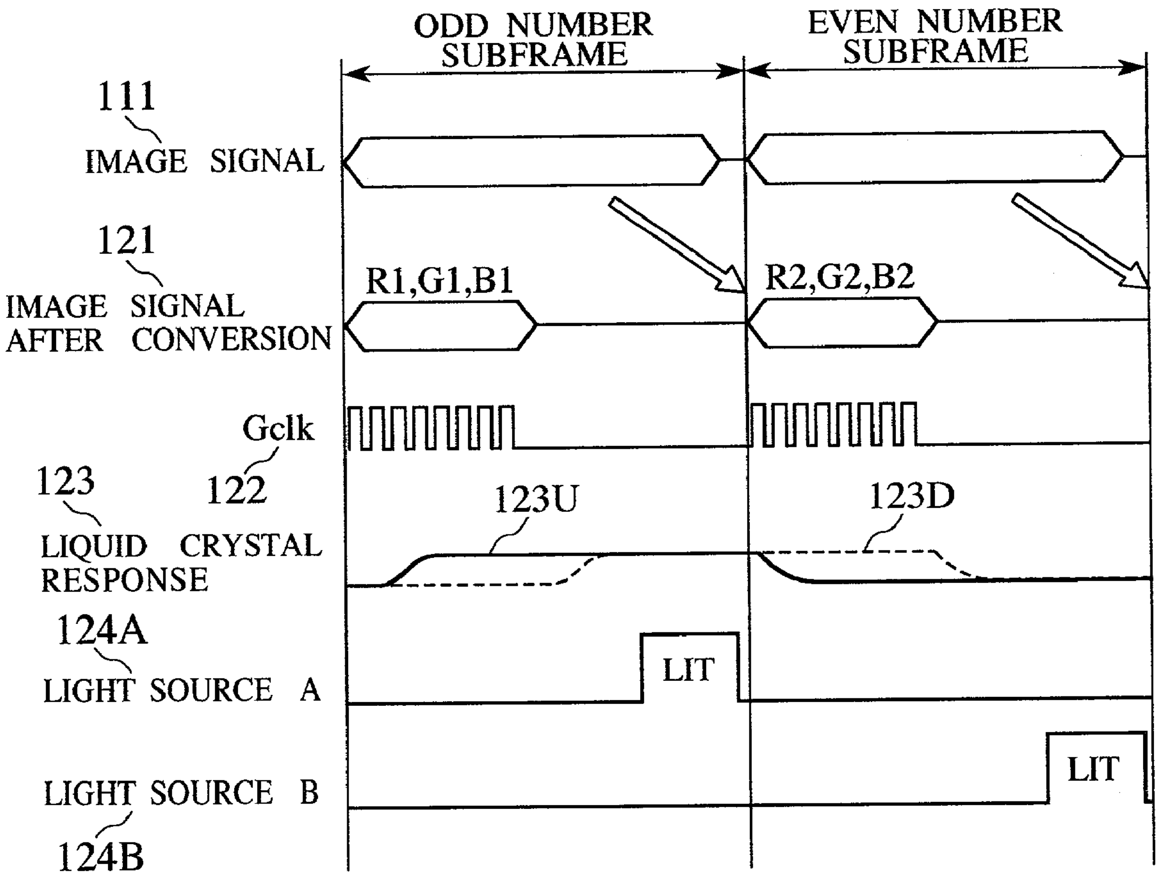
FIG. 5 is a signal diagram showing an example of a driving sequence according to the first embodiment.
Figure 6A:
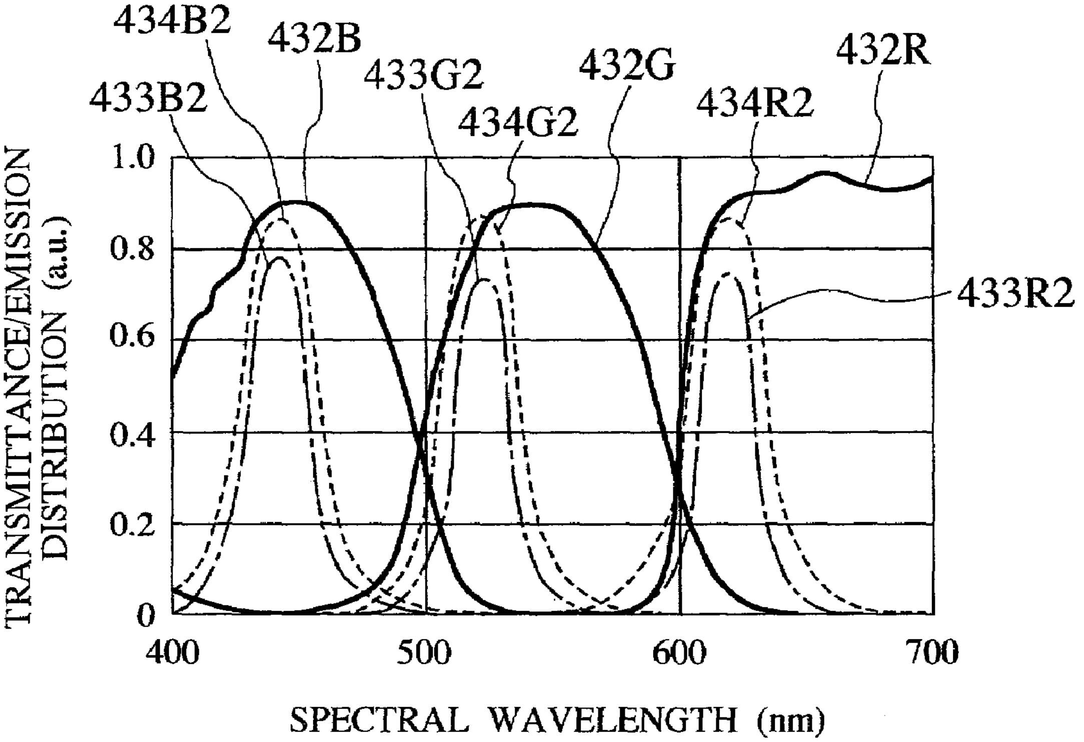
FIGS. 6A and 6B are graphs each showing spectral wavelength characteristics of light sources obtained by combining the light sources using the driving sequence with the color filters according to the first embodiment.
Figure 6B:
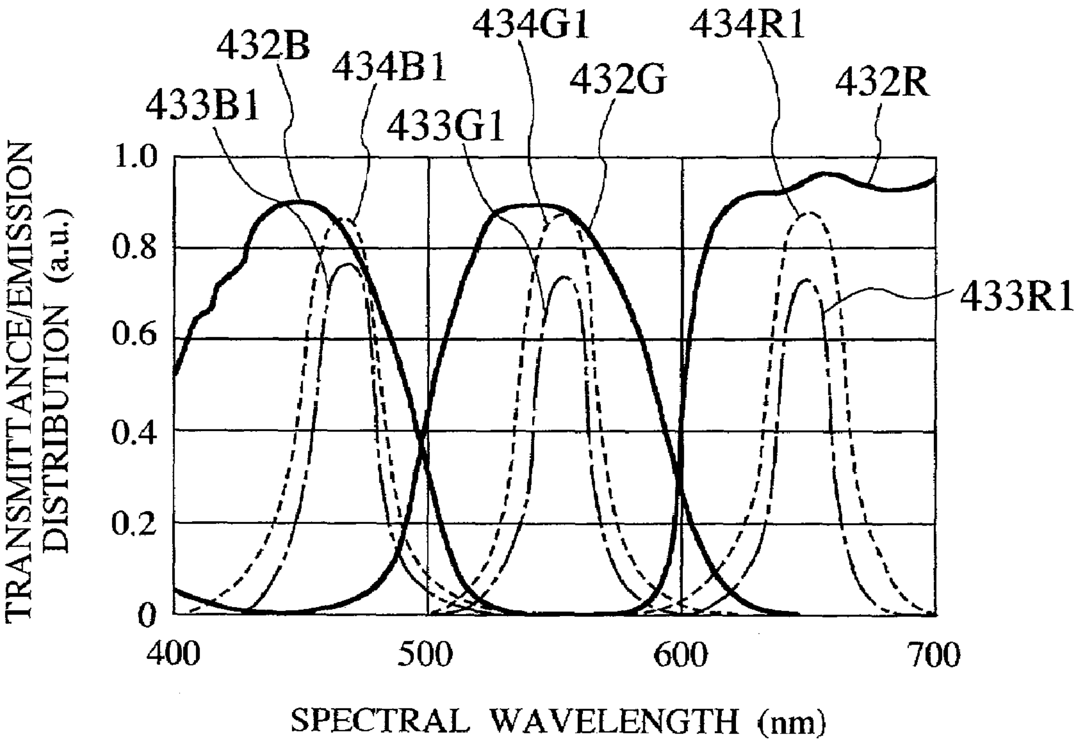
Figure 7:
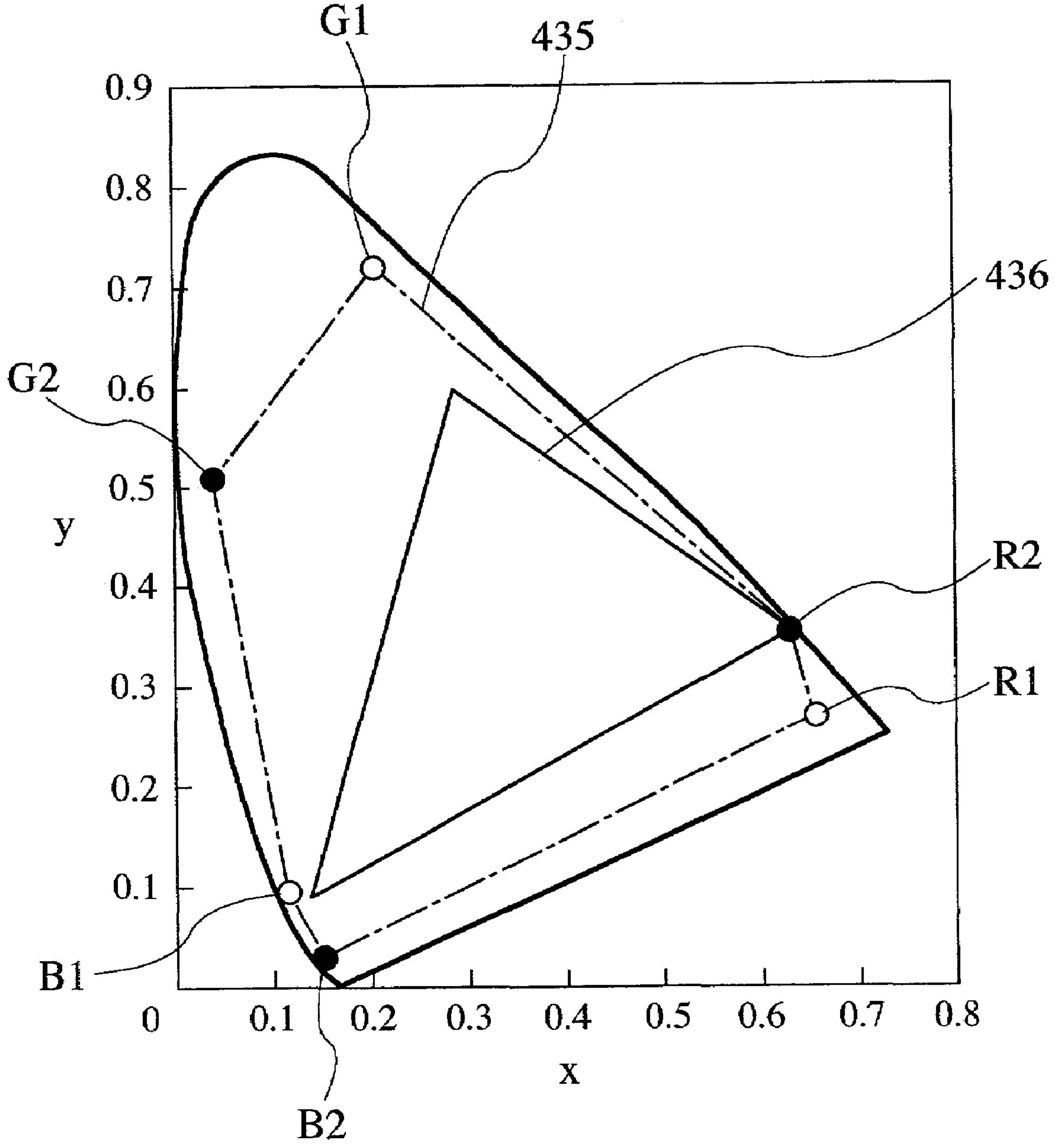
FIG. 7 is a chromaticity diagram showing characteristics of ranges of display colors obtained by the first embodiment.

FIG. 1A is a perspective view showing the configuration of a liquid crystal display device according to the first embodiment; FIGS. 1B and 1C are plan views each showing the configuration of a respective light source unit; FIG. 2 is a graph showing spectral wavelength characteristics of light sources and color filters according to the present embodiment; FIGS. 3A to 3D are diagrams which generally illustrate the principle of operation of the liquid crystal mode used in the present embodiment; FIG. 4 is a block diagram showing a system of the present embodiment; FIG. 5 shows a driving sequence according to the present embodiment; FIGS. 6A and 6B are graphs each showing spectral wavelength characteristics of light sources obtained by combining the light sources driven by the driving sequence with the color filters according to the first embodiment; and FIG. 7 is a diagram showing characteristics of ranges of display colors achieved by the first embodiment.

The configuration of the liquid crystal display device of the present embodiment will be described with reference to FIG. 1A. The liquid crystal display device is characterized by the fact that it is capable of displaying a multi-color image by: (1) using LED array light sources that are superior in color purity as a light source; (2) using two types of LED arrays that have different wavelength characteristics; (3) performing time-division lighting of the two LED light sources in synchronization with display of a liquid crystal display panel; and (4) combining the light sources with color filters, each of which is arranged for subpixels in a liquid crystal display unit and has a bandwidth wider than the emission distribution of each of the light sources, thereby to selectively transmit light from some of the light sources in time sequence by way of the color filters.

The basic configuration of a liquid crystal display unit 430 that serves as a inplane switch for light in accordance with an image is substantially the same as that of a conventional liquid crystal display device. In this regard, a pair of polarizing plates 406, that are disposed on a cross nicole are bonded on either side of a pair of transparent substrates 403, and color filters 410 of three colors are formed inside one of the glass substrates in alignment with the subpixels. In order to maintain a constant gap between the transparent substrates 403, pillars (not shown) each composed of a photosensitive resin are disposed on one of the substrates at an interval that is the same as that between subpixels, the pillars each having an area that is determined so as not to deteriorate the transmittance of the pixels. Specifically, each pillar is in the form of a cylinder having a diameter of several micrometers (μm). A liquid crystal composition is retained between the pair of transparent substrates 403.

An active matrix circuit (not shown), that is provided on one of the glass substrates, is used to apply voltages to the liquid crystal. By employing active matrix driving, it is possible to widen the range of selections for liquid crystal display modes, and a large screen display with high definition can be realized by selecting the twisted nematic mode that is capable of high speed response or the inplane switching mode characterized by a wide viewing angle. Further, providing memory circuits in pixels enables simultaneous rewriting of all images, since it is possible to display another image stored in a previous frame while rewriting information on memory capacity in pixels line-sequentially. The above-described configuration eliminates the need for taking the rewrite period into consideration; and, therefore, the configuration is suitable for the present invention, wherein the light sources are switched on and off time-sequentially.

Under the liquid crystal display unit 430, there are disposed a pair of light source units 431, one of which is composed of a lightpipe 412A and an LED array light source 411A, and the other is composed of a lightpipe 412B and an LED array light source 411B, each of the lightpipe being formed of transparent acryl and having a wedge-like shape. Examples of the alignment of the LEDs in the LED array light sources of the present embodiment are shown in FIGS. 1B and 1C.

The configuration shown in FIG. 1B is a light source wherein the two LED array light sources 411A and 411B have different emission distributions, and each of the LED array light sources has three types of LEDs and generates peak wavelengths of three colors. A combination of the emission wavelengths is characterized by placing, among two types of LED arrays having six types of emission wavelength distributions that form the two LED arrays, LEDs having adjacent emission wavelengths at separate LED array light sources. These light sources enable six primary color emission peaks at the maximum. Each of the LEDs used in the present embodiment has a single peak wavelength; however, it is possible to achieve a low-profile by using a LED chip wherein each of LEDs has a plurality of peak wavelengths.

The configuration shown in FIG. 1C is especially suitable for a display device that requires a high degree of brightness, since each of the LED array light sources consists of LEDs for all the six primary colors. In the present embodiment, LEDs for all of the types are used for the LED array light sources; and, therefore, an external circuit is configured so that emission sequences are controlled for the six colors and various combinations of the colors.

In the following descriptions, a case which employs the LED array light source 411A and the LED array light source 411B, having different emission distributions, will be illustrated for better understanding.

A relationship between spectral transmittance and fluorescence wavelength distribution of each of the above-described color filters and LEDs will be described with reference to FIG. 2. The transmittance distributions of the color filters of three colors 432R (red), 432G (green) and 432B (blue) are substantially the same as those used in a conventional liquid crystal display unit, and the LED array light sources are characterized by the fact that they include LEDs of two primary colors that are substantially in the range of the transmission wavelengths of the color filters. For example, it is possible to control two primary colors with one subpixel by combining emission characteristics 433R1 and 433R2 as LEDs whose emission wavelengths are included in the transmittance distribution 432R of the red color filter and switching on and off the LEDs in time sequence. In the same manner, emission characteristics 433G1 and 433G2 are used in combination as LEDs for the transmittance distribution 432G of the green color filter, and emission characteristics 433B1 and 433B2 are used in combination as LEDs for the transmittance distribution 432B of the blue color filter.

The present embodiment uses LEDs respectively having peak wavelengths of 450 nm, 470 nm, 505 nm, 550 nm, 620 nm and 660 nm; however it is possible to employ other combinations of LEDs. Each of the emission characteristics of the LED light sources used in the present embodiment has a narrow bandwidth of 20 to 30 nm, which is usually a half of a color filter, and it is possible to allocate two or three color LEDs to a transmission wavelength width of a one-color filter. In order to increase the color purity, the number of light sources passing light through a one-color filter and the number of whole primary colors to be used for display, it is effective to use a semiconductor laser chip having emission characteristics in a narrow bandwidth to construct the light sources. Since the number of subpixels making up one pixel can be reduced by the use of a laser light source, it is possible to increase the resolution and the numerical aperture.

Color filters of three colors are used in the present embodiment; however, the number of color filters can be increased so long as the resolution is not deteriorated and provided that the colors are different from one another. The increase in the number of color filters results in an increase in the number of primary colors, which is determined as a product of the number of peak wavelengths of LEDs and the number of colors of color filters, thereby expanding the display range.

Further, in view of the fact that a light source having broad characteristics and color filters having characteristics having areas that overlap with one another to a remarkable degree have been used in the conventional liquid crystal display device for display, it is needless to say that the expansion of the color reproduction range, which is an object of the present invention, can be achieved even if color filters and light sources having characteristics including some color mixture are used.

Next, an example of the inplane switching mode will be described. FIGS. 3A and 3B are sectional views each showing movement of a liquid crystal in an inplane switching mode liquid crystal panel. FIGS. 3C and 3D are plan views of the arrangements shown in FIGS. 3A and 3B, respectively. In the drawings, active elements are omitted. Further, although electrodes in the form of stripes are arranged to form a plurality of pixels in an actual construction, one pixel is shown in the drawings.

FIG. 3A is a sectional view showing a cell when a voltage is not applied, and FIG. 3C is a plan view thereof. A pair of electrodes 401 and 402 are formed inside the pair of transparent substrates 403 in the form of spaced parallel lines, and an orientation controlling coating 404 is applied thereon by which the liquid crystals are oriented. A linear liquid crystal 405 is directed to form a certain angle, i.e., an angle of 45 degrees ≦| an angle formed by a liquid crystal major axis (optical axis) with respect to a field direction near an interface |< 90 degrees, with respect to a longitudinal direction of the stripe-shaped electrodes, when no field is applied thereto.

Liquid crystals that are oriented in parallel on an interface of the upper and lower substrates will be described by way of example. Further, it is assumed that the dielectric anisotropy of the liquid crystal composition is positive.

Next, the liquid crystal molecules change their directions relative to the field direction when the electric field 407 is applied, as shown in FIGS. 3B and 3D. By directing the polarizing transmission axis of the polarizing plates 406 to a predetermined angle 409, it is possible to change the transmittance by application of the electric field. When the field is applied in a direction primarily along the substrate faces by way of the electrodes on the substrates, the liquid crystals rotate in a plane parallel to the substrates to change the angle of the polarizing plate with respect to the transmission axis, thereby changing the transmittance.

Most of the fields that are parallel to the substrates are generated between the electrodes; and, therefore, the liquid crystals between the electrodes mainly contribute to a change of transmittance, but hardly to the electrodes themselves. Accordingly, it is possible to replace the electrodes with non-transparent metal electrodes.

There are several parameters to be used as factors for determining a response speed of the inplane switching mode. The field may be effectively increased by narrowing the gap between the linear electrodes 401 and 402 or by increasing the voltage to be applied between the linear electrodes 401 and 402, and, therefore, the response speed of liquid crystals is increased in reverse proportion to the field.

Specific examples of the configuration for imparting a contrast ratio include the following: a mode (which will be referred to as “birefringent” in this specification since the mode takes advantage of an interference color generated by a double refraction phase difference) employing a state wherein the liquid crystal molecular orientations of the upper and the lower substrates are substantially parallel to each other; and a mode (which will be referred to as “optical rotating power” in this specification since the mode takes advantage of the optical rotating power wherein the polarized face is rotated in the liquid crystal composition layer) employing a state wherein the liquid crystal molecular orientations of the upper and the lower substrates are crossed so that the molecular arrays in a cell are twisted.

In the double refraction mode, a direction of a molecular major axis (optical axis) is changed by an application of voltage in substantially parallel to the interface of substrates in the plane to change the angle formed with respect to the axis of the polarizing plates that is set at a predetermined angle, thereby changing a light transmittance. In the optical rotating power mode, too, only the direction of the molecular major axis is actually changed by the application of a voltage; however, this mode takes advantage of a change in the optical rotating power caused by unraveling of the spirals, unlike the birefringent mode. Further, with the display mode of the present embodiment, the major axes of the liquid crystal molecules are always substantially in parallel to the substrates and do not rise in the vertical direction; therefore, the change in brightness usually caused by a change in the viewing angle is small, so that the present display mode is free from viewing angle dependency and has improved viewing angle characteristics.

The display mode achieves a dark state by changing the angle between the liquid crystal molecular major axis and the axis of the polarizing plates (absorption or transmission axis), which is primarily different from that of the conventional mode, wherein the dark state is achieved by setting the double refraction phase difference to null by way of a voltage. In the case of the conventional TN type, wherein the liquid crystal molecular major axis rises perpendicularly to a substrate face, the viewing angle direction in which the double refraction phase difference becomes null is achieved only when the display is viewed from the front, i.e., a direction perpendicular to the substrate interface. Thus, a slight inclination causes a change in the double refraction phase difference. In the normally open type, light tends to escape to cause a deterioration in the contrast ratio and reversal of the gradation level.

FIG. 4 is a block diagram showing the system of the present embodiment, and FIG. 5 shows an example of the driving sequence. The system comprises: an image source 110 associated with the multi-color display; a primary color conversion circuit 112 for converting an image signal 111, which represents image data for the image source, into image data in accordance with the driving sequence of the display device of the present embodiment; a plurality of memory buffers 114 that are used for setting a display timing of a time-division driving; a buffer selecting circuit 115 for selecting an output from any one of the memory buffers 114 in accordance with the driving sequence; a timing controlling circuit 113 for controlling the overall driving sequence; a liquid crystal display unit 430; and a light source unit 431.

In the present embodiment, the liquid crystal display unit employs an active matrix type driving circuit. Therefore, the liquid crystal display unit 430 is provided with a scanning circuit 413 and a signal circuit 414 for supplying voltages to a scanning line (not shown) and a signal line (not shown), and receives signal voltages synchronized with image signals from the timing controlling circuit 113 to write the voltages to pixels. Examples of formats of the image data from the timing controlling circuit image source may be a color coordinate data format having a number of primary colors in accordance with multi-color display, a format wherein ambient light information is added to brightness information on three primary colors, a format wherein data are displayed by an X, Y, Z calorimetric system having color information on all the visible area and the like. The system can use brightness information for three primary colors solely as the image source when so required. In the case where only the brightness information on three primary colors is used as the image source, a hard or soft switch may be provided in the timing controlling circuit 113 so that the switch is changed over from a multi-color mode to a three primary color mode upon reception of the three spectral brightness information; the primary colors conversion circuit and the buffer memories 114 are set to through states; and the information is transmitted directly to the signal driving circuit 414 without being subjected to signal conversion, with both of the LED array light sources 411A and 411B being lit continuously. Since all the LEDs are lit continuously, a bright display that is satisfactory in white balance is achieved. Further, peak brightness in the case of the multi-color display may be used in combination so as to eliminate factitiousness due to a change in brightness, if any.

The driving sequence will be described with reference to FIG. 5. In the present embodiment, two primary colors are selected by using a one-color filter; therefore, one frame is divided into two subframes and a display by way of the liquid crystal display unit and the light sources is accomplished in each of the subframes. Conversion from the image signal 111 of the image source to a primary color signal for the display device is performed in such a manner that converted image signals 121 are received by the buffer memories so that the output timings of the image source and the buffer frame are asynchronous to each other, thereby enabling the converted image signals 121 to be outputted at an arbitrary frequency. Therefore, the multi-color conversion processing is not included in a calculation period of subframe periods. The image signal after the primary colors conversion is written to pixels line-sequentially from an uppermost row of the display screen by a gate clock 122 and a data clock that is not shown.

Another driving sequence is achieved in the order of writing voltages to pixels, optical response from the liquid crystal and then lighting of the light sources. Since the frame frequency is set to be 60 Hz, the subframe period is about 8.3 milliseconds. The writing period is 5 microseconds per row and the number of rows is 480; and, therefore, the time required for the writing is 2.4 milliseconds. The time required for each of the liquid crystal responses from white to black and from black to white is about 3 milliseconds. The electrodes configuration and liquid crystal material are selected in view of the above parameters relating to time. Thus, a light source lighting period obtained by subtracting the writing period and the liquid crystal response periods from the subframe period is 2.6 milliseconds for each subframe.

FIG. 6A and FIG. 6B respectively show spectral display characteristics of the liquid crystal display device obtained by the present embodiment, and FIG. 7 shows the display chromaticity characteristics of the respective primary colors. FIG. 6A shows spectral display characteristics 434 (R2, G2, B2) achieved by the liquid crystal display unit 430 and the light source unit 431 when the LED array 411A, that uses the short wavelength side of each of the color filters, is lit. FIG. 6B shows spectral display characteristics 434 (R1, G1, B1) achieved by the liquid crystal display unit 430 and the light source unit 431 when the LED array 411B, that uses the long wavelength side of each of the color filters, is lit.

Spectral transmittances 432R, 432G, 432B of the color filters 410 and emission distributions 433R1, 433G1, 433B1, 433R2, 433G2 and 433B2 of the LED arrays 411A and 411B are illustrated in each of FIGS. 6A and 6B. The spectral display characteristics indicate that displays that have less of an overlapping portion and are high in color purity can be realized. Further, since the emission wavelength area of the light sources is substantially included in the transmission wavelength area of the color filters, most of the emissions from the light sources transmit through the color filters, thereby realizing a multi-color display device that is high in brightness and low in power consumption.

FIG. 7 shows a display chromaticity diagram of the display device. Each of the dots indicates a display color obtained when the LED array 411A on the short wavelength side is lit, and a circle indicates a display color obtained when the LED array 411B on the long wavelength side is lit. A range of display colors 435 in terms of the overall display device is an area of a hexagon made by plotting the six display colors. It is apparent that the range of display colors 435 of the present embodiment is remarkably expanded as compared with a range of display colors 436 achieved by a three primary color light source.

According to the present embodiment, it is possible to realize a multi-color display without deteriorating the resolution of pixels by lighting the color filters of three colors and the two types of three primary color light sources time-sequentially and rewriting the liquid crystal unit in synchronization with the three primary color light sources.

Second Embodiment

A second embodiment of the present invention will be described with reference to FIG. 8 and FIG. 9. In the first embodiment, a disadvantage will arise due to the time required for rewriting voltages to be applied to pixels for one screen image in the case where the bright display is achieved by increasing the period of lighting the light sources; however, the present embodiment is able to eliminate this possible disadvantage. A description of the system configuration of the present embodiment will be omitted, since it is substantially the same as that of the first embodiment shown in FIG. 4.

Figure 8:
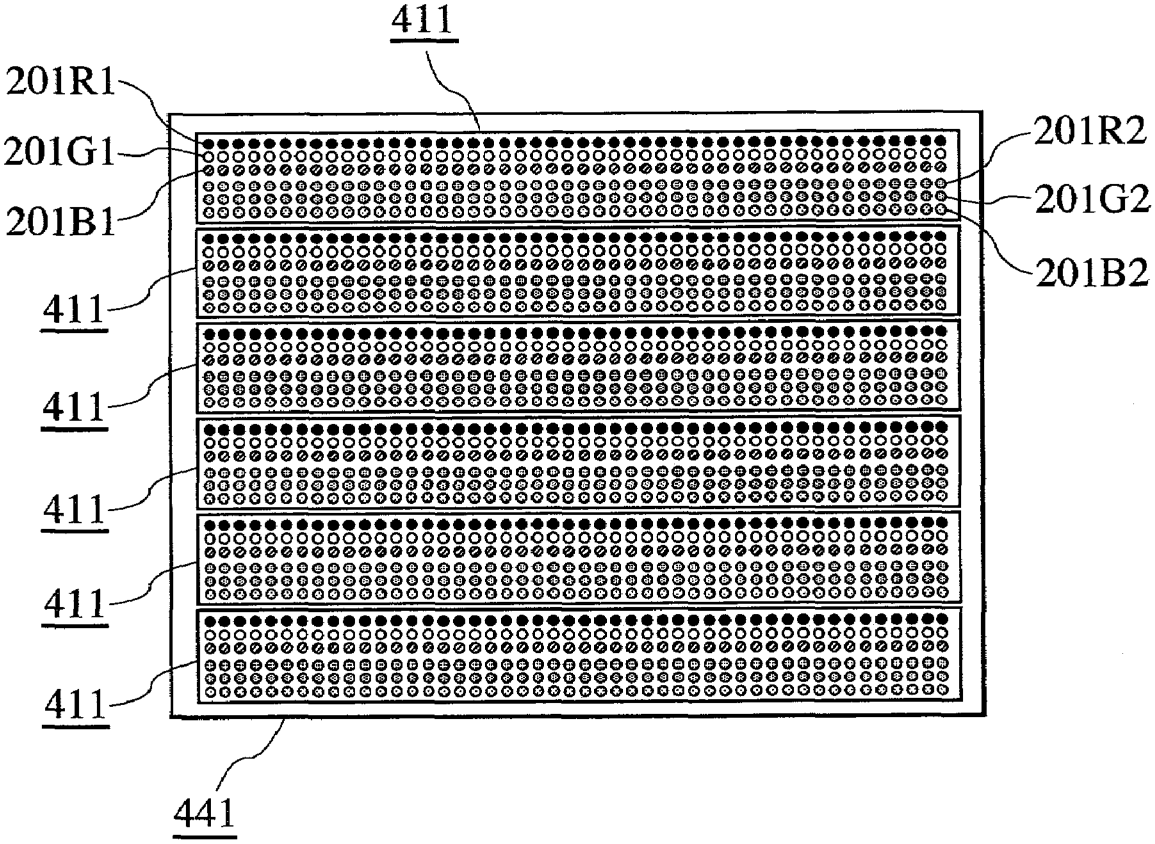
FIG. 8 is a plan view showing the configuration of a light source unit according to a second embodiment of the present invention.

FIG. 8 shows a light source unit 431 of the present embodiment employing a plurality of LED arrays 411. Each of the LED arrays 411 is the same as that used in the first embodiment, but the light source unit 431 is characterized by the manner in which the plurality of the LED arrays are aligned and by the fact that its emission area is substantially the same as that of the liquid crystal display unit (not shown). The light source unit 431 does not have a lightpipe and consists of the LED arrays 411.

An example of the driving sequence will be described with reference to FIG. 9. The driving sequence is substantially the same as that of the first embodiment, and one frame is divided into two subframes, since a one-color filter selects two primary colors. Conversion from an image signal 111 of a image source to a primary color signal for a display device is performed in such a manner that converted image signals 121 are received by the buffer memories so that the output timings of the image source and the buffer frame are asynchronous to each other, thereby enabling the converted image signals 121 to be outputted at an arbitrary frequency. Therefore, the spectral conversion processing is not included in a calculation period of the subframe periods. Further, the liquid crystal response and lighting of the LED array light sources 411 are performed in synchronization.

Figure 9:
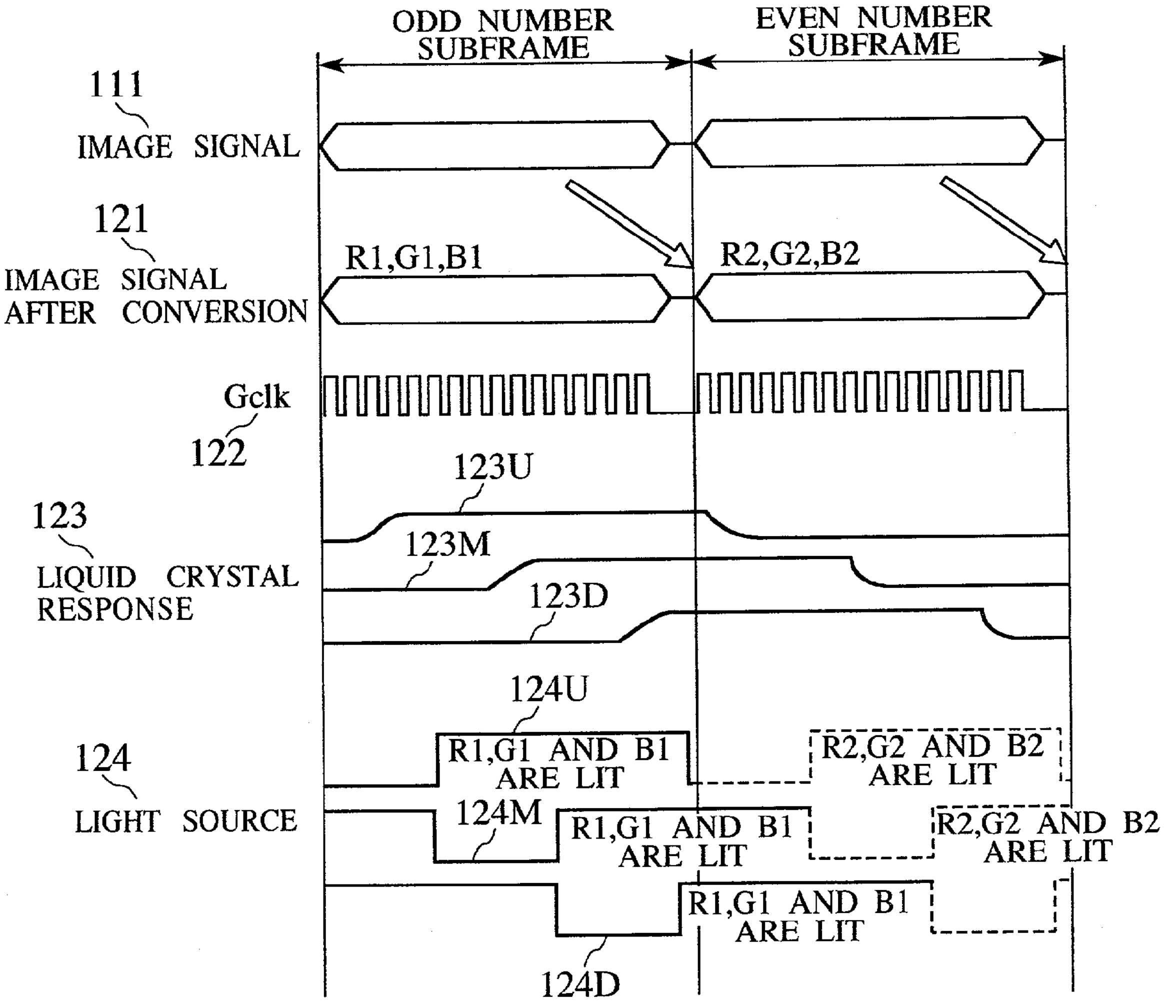
FIG. 9 is a signal diagram showing an example of a driving sequence according to the second embodiment.

In the driving sequence shown in FIG. 9, a liquid crystal response 123U indicates a response from an upper portion of the liquid crystal display unit; a liquid crystal response 123M indicates a response from a center portion of the liquid crystal display unit; and a liquid crystal response 123D indicates a response from a lower portion of the liquid crystal display unit. The ON/OFF timings of the LED array light sources, which respectively illuminate the above portions for the respective liquid crystal responses are denoted by 124U, 124M and 124D. As shown in FIG. 9, each of the LED array light sources 411 is lit when the relevant liquid crystals complete the response to a change in an applied voltage after writing, and then it is turned off immediately before a transfer to a subsequent voltage writing.

A bright multi-color display is realized by the use of the above-described driving sequence, since sufficient light illumination is achieved by the driving sequence without being influenced by a color mixture otherwise caused by the emissions from the adjacent subframes. The present embodiment realizes a lighting period of 5 milliseconds or more and a brightness of about two times that of the first embodiment.

According to the present invention, a circuit for effecting independent ON/OFF control of each of the LED arrays is provided in addition to the timing controlling circuit 113 in the system configuration shown in FIG. 4. Modification of the circuit is such that the number of switches is changed to be the same as the number of the LED array light sources 411, and a sequencer for controlling synchronization of the liquid crystal responses is added.

Third Embodiment

A third embodiment of the present invention will be described with reference to FIG. 12. In the first embodiment, a disadvantage will arise due to the time required for rewriting voltages to be applied to pixels for one screen image in the case where a bright display is achieved by increasing the period of lighting the light sources; however, the present embodiment is able to eliminate this possible disadvantage. A description of the system configuration of the present embodiment will be omitted, since it is substantially the same as that of the first embodiment shown in FIG. 4.

The LED array light sources used in the present embodiment are the same as those used in the first embodiment. The present embodiment is characterized in that a voltage applying circuit for applying voltages to a memory circuit for temporary storage of image data and liquid crystal is provided for each of the pixels, and that the memory circuit and the voltage applying circuit are operated in synchronization. That is to say, voltages in response to information that is written in the memory circuit in a previous subframe are applied to liquid crystals when writing the image data after primary color conversion.

Figure 12:
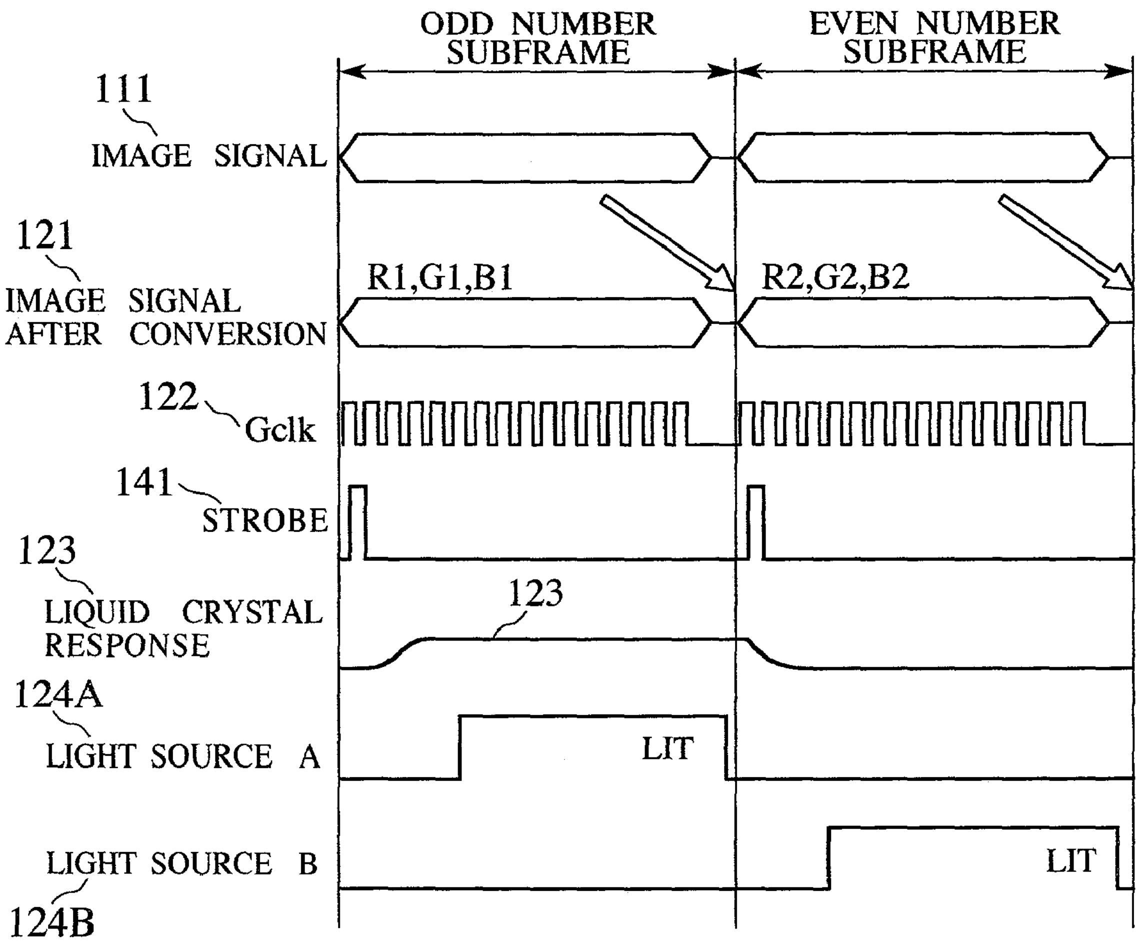
FIG. 12 is a signal diagram showing an example of a driving sequence according to a third embodiment.

FIG. 12 shows a driving sequence of the present embodiment. Voltage-writing to a pixel memory is performed by a gate clock 122, and a voltage in accordance with an image signal 121 is written to the memory circuit in a pixel line-sequentially. After rewriting image signals for one subframe, voltages for an overall screen image are written by a strobe signal 141 to a circuit for writing them to liquid crystals on a batch basis, and then the light sources are lit after an optical response period of the liquid crystals, as indicated by the liquid crystal response 123. Since turning off of the light sources can be performed immediately before a strobe signal 141 of a next subframe appears, a long lighting period is secured, thereby realizing a bright multicolor display.

Fourth Embodiment

A fourth embodiment of the present invention will be described with reference to FIG. 10. The present embodiment is the same as the first embodiment, except for the use of fluorescent lamps, which are popular light sources, in place of the LED array light sources. The fluorescent lamp is characterized by a wide wavelength selectivity, a smaller number of components as compared with the LED array light sources, a high degree of efficiency achieved by a large amount of emission per supplied power and so on.

Figure 10:
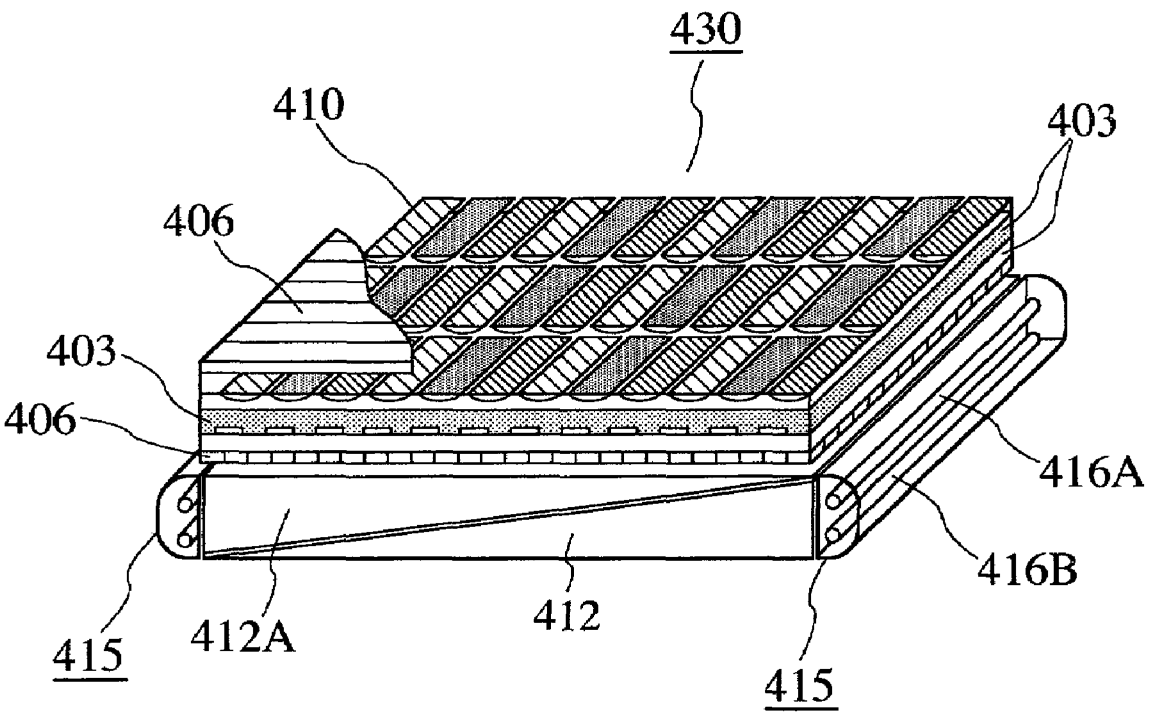
FIG. 10 is a partially cut-away perspective view showing the configuration of a liquid crystal display device according to a fourth embodiment of the present invention.
Figure 11:
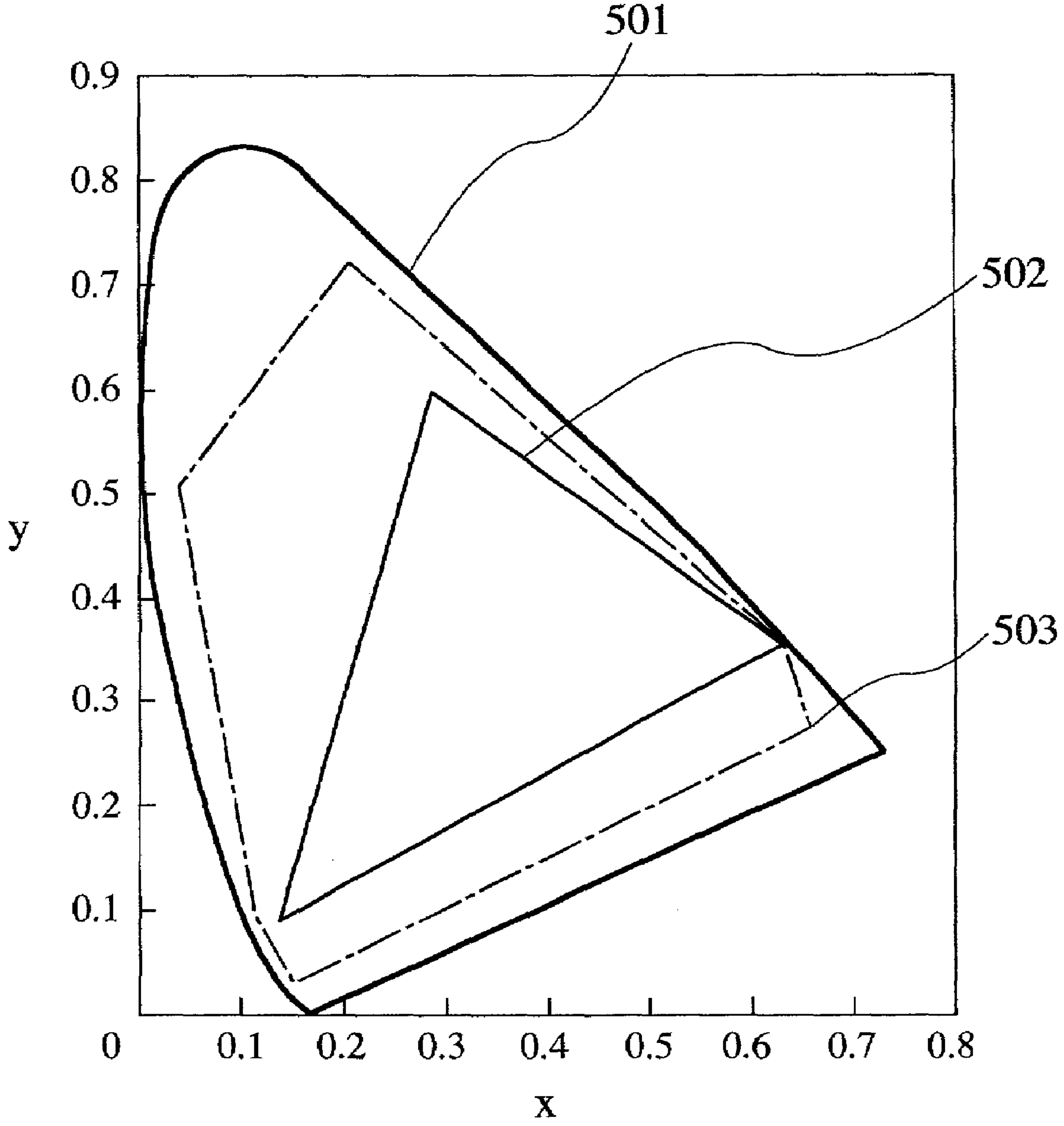
FIG. 11 is a chromaticity diagram showing ranges of display colors obtained by the conventional multi-color display device.

FIG. 10 is a perspective view showing an example of the configuration of a liquid crystal display device of the present embodiment. The liquid crystal display device has substantially the same configuration as that of the display device of the first embodiment, and includes fluorescent lamps 416A and 416B having different emission wavelength distributions. In the present embodiment, light generated by the fluorescent lamps 416A and 416B in time sequence are guided to a liquid crystal display unit 430 by way of a lightpipe 412 so as to be combined with color filters of the liquid crystal display unit 430, thereby realizing a multicolor display.

The multi-color light source may be realized by combining various phosphors. Examples of the fluorescent materials include materials, each of which is formed of $Sr_2P_2O_7$:$Eu^{2+}$ to be used as a fluorescence material for 420 nm; $BaMgAl_{10}O_{17}$:$Eu^{2+}$ to be used as a fluorescence material for 450 nm; $3Ca_3(PO_4)_2.Ca(F,Cl)_2$:$Sb^{3+}$ to be used as a fluorescence material for 480 nm; $Zn_2SiO_4$:$Mn^{2+}$ to be used as a fluorescence material for 525 nm; LaOCl: Cl, Tb to be used as a fluorescence material for 560 nm; $Y_2O_3:Eu^{2+}$ to be used as a fluorescence material for 611 nm; $3.5MgO.0.5MgF.GeO_2:Mn^{4+}$ to be used as a fluorescence material for 655 nm. Although fluorescent lamps are used in the present embodiment, it is possible to employ a method for achieving a desired wavelength by irradiating a fluorescent material with light generated by an LED or a laser emitting device that emits near-ultraviolet rays or ultraviolet rays in the near-ultraviolet domain or ultraviolet domain.

Fifth Embodiment

A fifth embodiment of the present invention will be described below. Hereinbefore, the descriptions are directed to methods for realizing a multi-color display by selecting a light source to be used from those provided for the respective primary colors. In the present embodiment, the display colors include three or more primary colors for the purpose of realizing a high-fidelity reproduction of images, and information on ambient light at a location of capturing an image and information on ambient light at a location where a viewer watches the image via a display device are inputted into a control unit, whereby the wavelengths of the spectral emission are controlled based on the ambient light information, leading to improvement of color reproducibility.

A variable laser diode, an LED and the like may effectively be used as controlling means to instantly control the wavelengths. Further, It is possible to control the light source primary colors based on instructions from the viewer so that a desired color reproduction is achieved.

As described above, the present embodiment realizes a multi-color display in view of the ambient light without largely increasing the number of subpixels and the fixed number of spectrum.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An image display device comprising:

a pair of transparent substrates;

a liquid crystal composition and at least two types of color filters disposed between said pair of substrates;

at least two types of light sources, each of said light sources having an emission distribution which is different from one another, and each of said light sources generating peak wavelengths of at least three colors; and light source controlling means for switching on and off said light sources, which generate peak wavelengths of said at least three colors, in time sequence within one frame period.

2. The image display device according to claim 1, wherein a shape formed by coordinates on a chromaticity diagram for output light, which is generated by the display device, is a closed figure of at least four sides and having a vertex which is in the shape of a convexity.

3. The image display device according to claim 1, wherein three types of color filters are provided.

4. The image display device according to claim 3, wherein a wavelength band to be selected depending on each of the color filters includes a maximum value of brightness of the peak wavelength of color, and a band of each of the peak wavelength is narrower than the wavelength band of each of the color filters.

5. The image display device according to claim 1, further comprising a function for switching between a mode for lighting all the types of light sources and a mode for selectively lighting the light sources.

6. The image display device according to claim 1, wherein the image display device is an active matrix type liquid crystal display device.

7. The image display device according to claim 6, wherein display voltages are written for all the pixels when the light sources for irradiating the active matrix type liquid crystal display device are not lit.

8. The image display device according to claim 7, wherein the active matrix type liquid crystal panel device has a function of changing display of all the pixels simultaneously.

9. The image display device according to claim 8, further comprising a memory for storing image data in each of the pixels in the liquid crystal panel device in the format of digitized information obtained by converting a voltage value or multivalue; and a strobe function for writing a voltage or a current value to each of the pixels in accordance with the information stored in the memory;

whereby the function of changing all the pixels simultaneously is achieved.

10. The image display device according to claim 6, wherein a plurality of array light sources is aligned in a scanning direction for image rewriting of the active matrix type liquid crystal display device, and lighting of the light sources are scrolled in synchronization with the rewrite scanning.

11. The image display device according to claim 1, wherein a display mode of the liquid crystal is an inplane switching mode.

12. The image display device according to claim 1, wherein each of the light sources is a laser light source or an emission diode.

13. The image display device according to claim 1, wherein each of the light sources is a light source that uses an emission generated by irradiating a fluorescent material with ultraviolet rays.

14. The image display device according to claim 1, wherein a spectral wavelength or a spectral distribution of each of the light sources to be used for image display is controlled based on instructions from a viewer of the image display device, light source information on a location where an image is captured, instructions from a creator of the image, or light source information on a location where the image display device is viewed.

15. The image display device according to claim 1, wherein the number of the light sources is two, and each of the light sources generates peak wavelengths of three colors.

16. The image display device according to claim 1, wherein the one frame period includes at least two subframes controlled in a time-division basis.

17. The image display device according to claim 1, wherein the light source controlling means is responsive to instruction of a viewer of the image display device.

18. The image display device according to claim 1, wherein the at least two types of light sources are arranged in a direction of rewrite scanning, the light sources being controlled in accordance with the rewrite scanning.

19. The image display device according to claim 2, wherein the closed figure of at least four sides is a hexagon.

* * * * *